United States Patent [19]

Modes

[11] 4,073,433
[45] Feb. 14, 1978

[54] CONTROL APPARATUS FOR WARM UP CYCLE OF AIR DISTRIBUTION SYSTEM

[75] Inventor: Edward Modes, Deerfield, Ill.

[73] Assignee: Powers Regulator Company, Skokie, Ill.

[21] Appl. No.: 707,900

[22] Filed: July 22, 1976

[51] Int. Cl.² ............................................. F24F 11/04
[52] U.S. Cl. ................................... 236/49; 236/80 R; 236/87
[58] Field of Search ............. 236/49, 1 C, 80 C, 80 R, 236/87, 80

[56] References Cited

U.S. PATENT DOCUMENTS

| | | |
|---|---|---|
| 3,743,180 | 7/1973 | Perkins et al. ...................... 236/49 X |
| 3,779,275 | 12/1973 | Ley et al. ................................. 236/49 |
| 3,806,027 | 4/1974 | Ginn et al. ............................... 236/49 |

Primary Examiner—William E. Wayner
Attorney, Agent, or Firm—James B. Blanchard

[57] ABSTRACT

Apparatus to override the primary pneumatic circuitry of an air distribution system during warm up cycles. Means are provided for nullifying the pressure signal, indicative of ambient temperature, to which the flow controller responds. In the preferred embodiment, the override means comprises a bimetallic helical element which operates to bleed the pneumatic thermostat's air supply, thereby reducing the temperature indicative signal to zero.

14 Claims, 2 Drawing Figures

CONTROL APPARATUS FOR WARM UP CYCLE OF AIR DISTRIBUTION SYSTEM

SUMMARY AND BACKGROUND OF THE INVENTION

The present invention relates generally to air distribution systems used to control the ambient temperature in an enclosed area. More specifically, the present invention relates to pneumatic apparatus for use in such systems wherein it is necessary or desirable to provide, during certain periods of operation, maximum air flow into the areas serviced by such systems independently of the ambient temperature therein.

Systems for automatically controlling the environmental temperature in habitable, enclosed areas generally employ a source of pressurized air which supplies air through ducts to the various rooms of the enclosure. In each room one or more terminal ports are utilized which typically employ ceiling mounted diffusers to distribute the conditioned air evenly throughout the room. In addition, such systems utilize a temperature sensing device and a controller which meters the volume of air discharged in response to changes in ambient temperature.

When an air distribution system such as that generally described above is used to control the ambient temperature in an enclosed area by the discharge of cool or chilled air thereto, the temperature sensing device and controller are typically arranged so that, as the temperature in the room increases, the controller allows greater volumes of chilled air to be discharged. In view of the fact that sometimes the area serviced by the air distribution system is at a very low ambient temperature when the system is started, as for example in the morning, prior art systems have provided for a warm up cycle which allows the discharge at the start-up period of warm or heated air. It is, of course, desirable to have as short a warm up cycle as possible and, thus, it is important that the volume controllers be adjustable to provide maximum air flow during these warm up periods. Unfortunately, the environmental or ambient temperature is very low at the start of the warm up period. The primary pneumatic circuitry utilized to control air flow during normal cooling periods will, therefore, operate to close down and provide minimum air flows to the enclosed areas during these warm up periods. Accordingly, in cool air distribution systems which require a warm up capability it is necessary to provide means for overriding or nullifying the pneumatic circuitry ordinarily used in the operation of the system such that maximum air flow will be provided to the enclosed area during the warm up cycle.

Typical prior art systems which provide such override capabilities are those disclosed in U.S. Pat. Nos. 3,743,180 and 3,806,027. These prior art systems, however, suffer from several disadvantages including the need for additional complex mechanical and pneumatic components which renders the air distribution system more expensive to manufacture, assemble and install.

Accordingly, the present invention is directed to an apparatus for use in an air distribution system, the apparatus having the capability of overriding the primary pneumatic circuitry which controls the discharge of cooling air into the enclosed area during the normal cooling cycle. The present invention finds a particularly advantageous application in an air distribution system which includes means for converting a variable pressure air supply to a substantially constant pressure air flow which constant pressure air flow is then utilized in generating a pneumatic signal indicative of ambient temperature. In such a system the substantially constant pressure air flow is transmitted to a pneumatic thermostat which generates the pneumatic signal in responses to changes in the ambient temperature. In accordance with the present invention means are provided for reducing the pressure of the substantially constant pressure air flow to a value sufficiently low to effectively nullify the function of the pneumatic thermostat, thereby allowing the volume controller to provide maximum air flow during the warm up cycle. In order to render the override apparatus independent of any external energy source, the override mechanism of the present invention is activated by the introduction into the air distribution system of heated air which is, of course, necessary for the warm up cycle.

BRIEF DESCRIPTION OF THE DRAWINGS

The novel features which are believed to be characteristic of the invention are set forth in the appended claims. The invention itself, however, together with further objects and attendant advantages thereof, will be best understood by reference to the following description taken in connection with the accompanying drawings, in which:

DETAILED DESCRIPTION OF THE INVENTION

Figure 1:
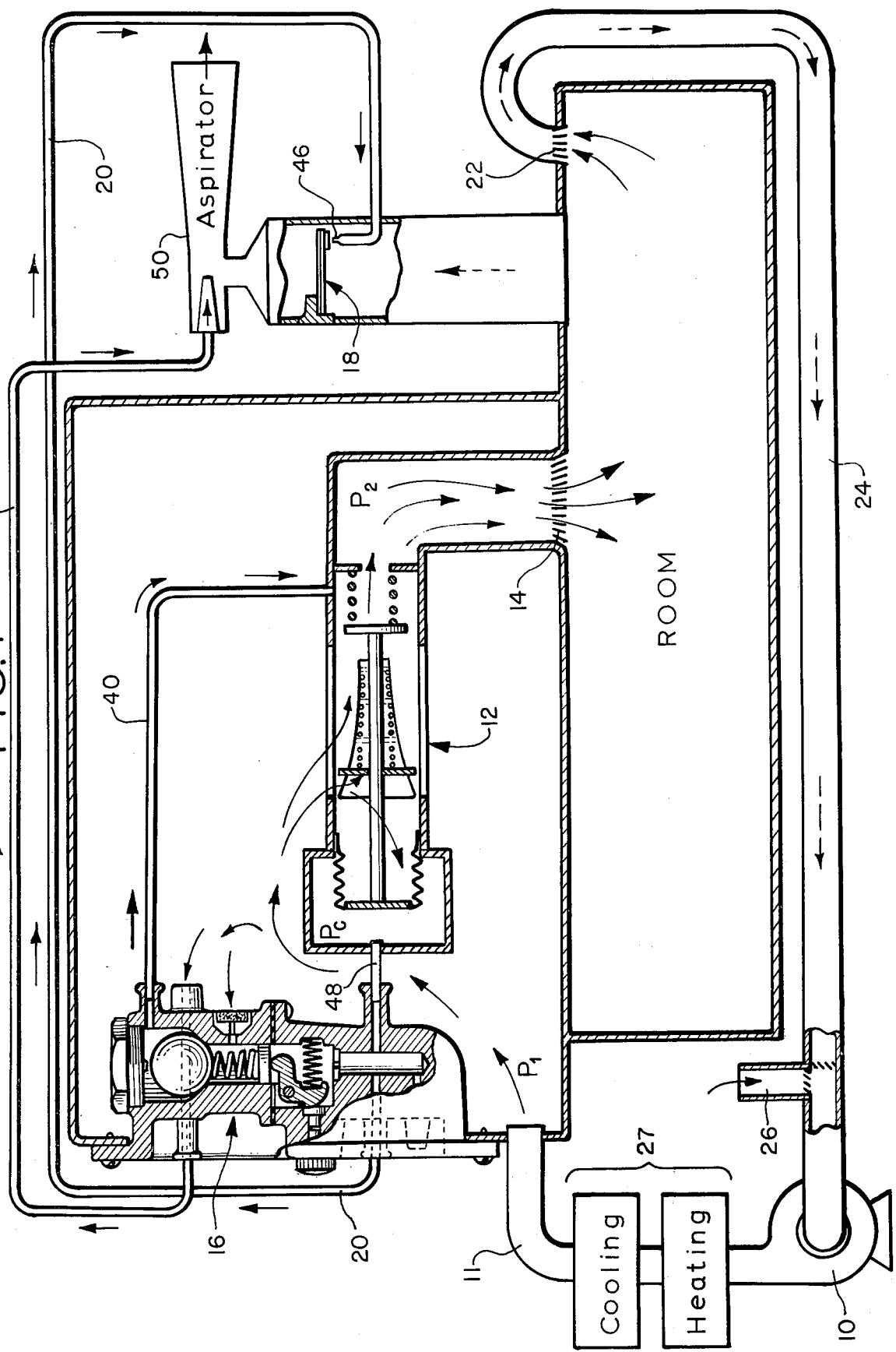
FIG. 1 is a schematic representation of an air distribution system which makes use of the apparatus of the present invention.

A typical air distribution system utilizing pneumatic primary control circuitry is illustrated in FIG. 1. Such an air distribution system will generally include a means for supplying pressurized air to the various rooms or enclosures, such as fan 10. The air supply is conveyed through either heating or cooling equipment, or both, and through duct 11 to a volume controller 12 which meters the discharge of conditioned air into the enclosures serviced by the system via termination ports such as diffuser 14.

The pneumatic primary control circuitry includes means for generating a pressure signal indicative of the ambient temperature in the area serviced by the system and means for transmitting this signal to the air volume controller which functions in response to the signal. In the embodiment illustrated in FIG. 1, this pneumatic circuitry consists of a pressure reducing valve 16 and a pneumatic thermostat 18. The pressure reducing valve 16 is capable of converting a variable pressure air supply, designated as $P_1$, to a substantially constant pressure air flow which is transmitted to the pneumatic thermostat 18 via conduit 20.

The air distribution system illustrated in FIG. 1 generally operates in the following manner. Fan 10 draws return air via return port 22 and conduit 24 and make up air via conduit 26 into the air conditioning equipment 27 which may either heat or cool the supply air depending upon the particular cycle in which the system is operating. The air supply at a pressure $P_1$ is then transmitted into the volume controller 12 which meters the discharge of air in response to a pressure signal $P_c$ which has been generated by the pneumatic circuitry. In order to generate the pressure signal $P_c$, which is indicative of ambient temperature, air is supplied to the pressure reducing valve 16 via orifice 30 (See FIG. 2). Pressure will build up in chamber 32 below the ball 34 until sufficient to raise the ball 34 from seat 36. In this manner chamber 32 is maintained at substantially constant pressure by the intermittent bleeding of air through seat 36, chamber 68, exhaust port 38 and conduit 40. Since the conduit 40 exhausts on the downstream side of controller 12 and at a pressure $P_2$, air will always bleed from chamber 32 to chamber 68 (since $P_1$ is always greater than $P_2$).

Due to the substantially constant pressure in chamber 32 a substantially constant pressure air supply is provided to drive the air flowing into chamber 42 via restriction orifice 44. The pressure developed in chamber 42 is first transmitted by conduit 20 to the pneumatic thermostat 18. At the thermostat variations in ambient temperature will cause corresponding variations in the exhaust of air from the nozzle 46 which terminates conduit 20. In this manner a pressure signal $P_c$ is generated and maintained in chamber 42 which is indicative of the ambient temperature in the area serviced by the system. This pressure signal is transmitted to the controller via conduit 48 where, in a manner well known to the art, the air flow passageway of the controller is adjusted to meter the proper volume of conditioned air through diffusion port 14. Chamber 42 also includes a test port 47 which is sealed by the closure nut 49. The test port allows proper adjustment of the circuitry by measuring the thermostat pressure at a given temperature.

In order to assure a more accurate temperature reading by thermostat 18 the pneumatic circuitry illustrated in FIG. 1 includes an aspirator 50 which receives air from the upstream side of flow regulator 12 via conduit 52. It will be appreciated that the aspirator 50 draws a continual flow of ambient air from the enclosure serviced by the system past the pneumatic thermostat thereby assuring an accurate reading of ambient temperature.

For a more detailed explanation of the air distribution system and the primary pneumatic circuitry in which the present invention may be advantageously employed, reference is hereby made to United States patent application Ser. No. 566,387 now U.S. Pat. No. 4,007,873, Feb. 15, 1977, having the same assignee as the present application.

Figure 2:
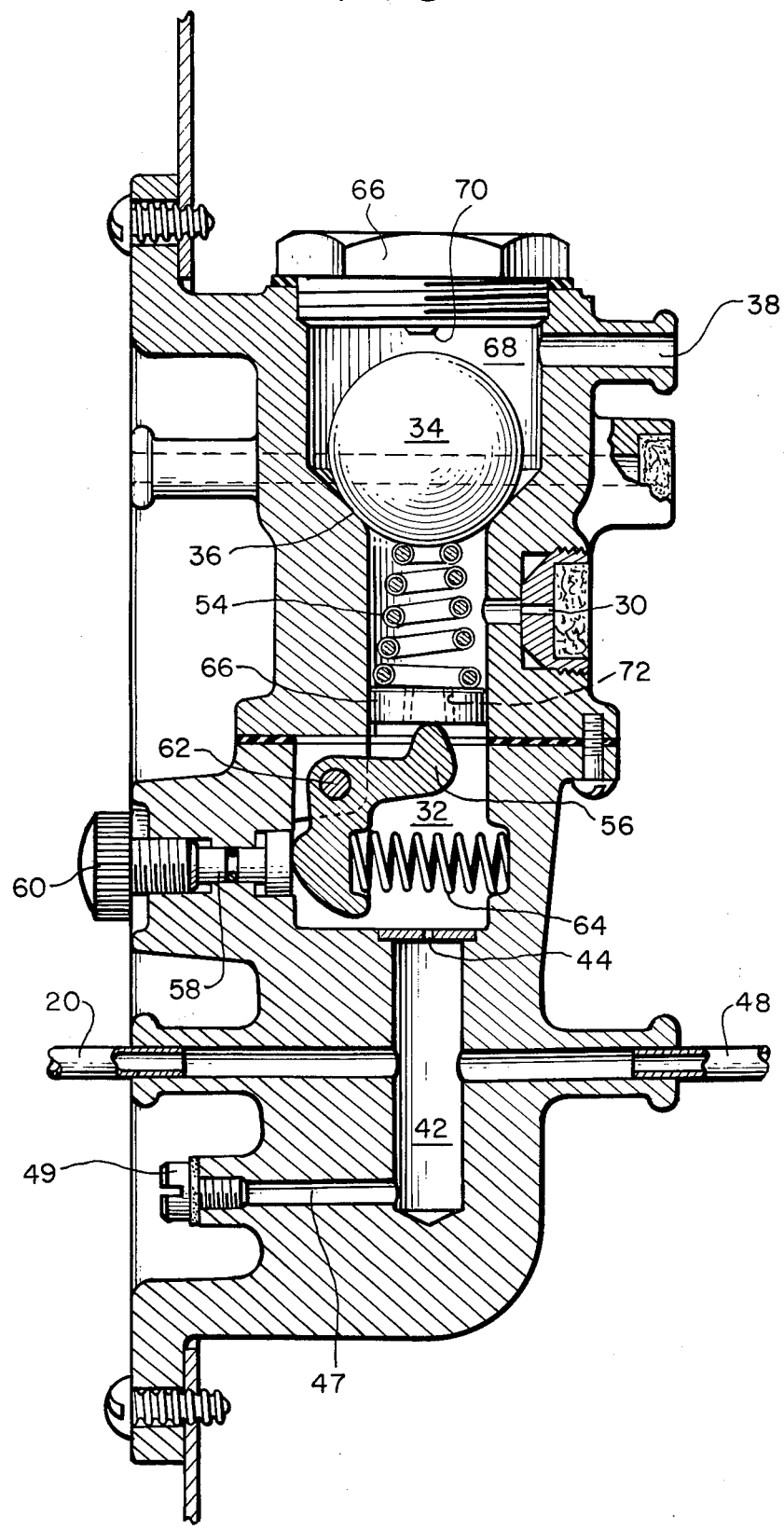
FIG. 2 is an enlarged cross-sectional view illustrating in greater detail one embodiment of the apparatus utilized to effect a warm up override in accordance with the present invention.

In accordance with the present invention the primary pneumatic circuitry illustrated in FIGS. 1 and 2, may be overriden such that the flow controller 12 will provide a maximum flow of air through diffuser port 14 independently of the ambient temperature sensed by pneumatic thermostat 18. Thus, during early morning warm up cycles when the ambient temperature is very low and the pneumatic circuitry would ordinarily provide a signal substantially closing the flow controller 12, the apparatus of the present invention is activated to open the flow controller 12.

In accordance with a preferred embodiment of the present invention the apparatus includes a bi-metalic helical element which is positioned within chamber 32 of valve 16 such that, upon the introduction of heated air into the air distribution system, the helical element 54 will expand lifting ball 34 from seats 36. In this manner the substantially constant pressure air flow transmitted into chamber 42 via restriction nozzle 44 will be reduced to a value sufficiently low that the function of the pneumatic thermostat 18 is effectively nullified and a substantially zero value $P_c$ is transmitted to the controller. Such a signal, as will be appreciated by those skilled in the art, results in the controller 12 opening to provide maximum air flow to the enclosure.

In order to assure that the helical element 54 will operate to continually bleed chamber 32 upon the introduction of heated air into that chamber, a manual adjustment is provided whereby the initial force counteracting the force of gravity on ball 34 may be varied. As is clearly seen in FIG. 2, in the preferred embodiment this adjustment means included a bell crank 56, a threaded shaft 58 and a set point nob 60. The bell crank is biased about pivot point 62 in a clockwise direction by the compression spring 64. Rotation of set nut 60 will axially displace shaft 58 thereby allowing bell crank 56 to rotate about pivot point 62. In turn, the spring buffer plate 66 will be displaced vertically in chamber 32 thereby adjusting the force exerted upwardly on ball 34. In this manner the override means of the present invention may be adjusted to be activated at any one of a wide range of temperatures. Of course, buffer plate 66 has some means, such as apertures 72, to insure the free flow of air between the upper and lower portions of chamber 32.

It will also be noted by reference to FIG. 2 that the cap 66 which seals chamber 68 is provided with a stop 70 which extends into chamber 68. This stop 70 prevents the displacement of ball 34 from seat 36 to a degree which would enable the helical element 54 from becoming lodged therebetween.

In accordance with the preferred embodiment of the present invention the pressure reducing valve 16 is mounted on the interior of the duct work which conveys the conditioned air to controller 12. This insures that the temperature in chamber 32 will be substantially the same as that of the supply air and that the override means will be quickly activated by the introduction of heated air into the air distribution system. Where the pressure reducing valve is to be mounted exterior to the distribution system's duct work it is desirable to properly insulate the valve 16 such that the flow of heated air into chamber 32 will not be dissipated through the chamber walls prior to the expansion of helical element 54.

Of course, it should be understood that various changes and modifications to the preferred embodiments described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An apparatus for controlling the ambient temperature in an enclosed area by regulating the flow of variable-pressure, conditioned air into said enclosed area, said apparatus comprising:

pressure regulator means having a pressure chamber for converting a portion of said variable pressure air to substantially constant pressure air provided in said pressure chamber;

signal generating communicating with said pressure chamber means for generating a pressure signal indicative of said ambient temperature, and including means for sensing said ambient temperature;

an air volume controller for metering said variable-pressure, conditioned air to said enclosed area, said pressure signal acting directly on said air controller; and overriding means interacting with said pressure regulator means for overriding said signal generating means by reducing the pressure in said pressure chamber to a sufficiently low level so that said pressure signal is at a minimum value regardless of the ambient temperature, whereby said controller provides maximum flow of variable pressure air to said area independently of said ambient temperature sensing means, said overriding means being activated upon the introduction of variable pressure air having a temperature substantially different from that normally used.

2. The apparatus of claim 1 wherein said variable pressure air supplied to said enclosed area is normally cool and said overriding means is activated by introduction of variable pressure air having a temperature substantially above that of said cool air.

3. The apparatus of claim 2 wherein said signal generating means includes a pneumatic thermostat and flow restriction interposed between said pressure chamber and said pneumatic thermostat; and wherein said overriding means reduces the pressure in said pressure chamber to a value sufficiently low to substantially nullify the function of said thermostat.

4. The apparatus of claim 3 wherein said pressure converting means is a pressure reducing valve having first and second chambers and means for intermittently bleeding said first chamber to said second chamber to produce a substantially constant pressure in said first chamber; and wherein said overriding means includes means for continually bleeding said first chamber upon the introduction of heated air into said first chamber.

5. The pneumatic apparatus of claim 4 wherein said overriding means is a bi-metallic helical element which acts to continually bleed said first chamber upon the introduction of heated air into said first chamber.

6. The apparatus of claim 5 further including means for adjusting said helical element to vary the temperature at which said element is activated.

7. An apparatus for use in an air distribution system which controls the ambient temperature in an enclosed area comprising:

means for generating a pressure signal indicative of said ambient temperature, said signal generating means including a pressure reducing valve having first and second chambers and a ball resting against a seat to close said first chamber from said second chamber and intermittently bleeding said first chamber to said second chamber to produce substantially constant pressure in said first chamber, a pneumatic thermostat, and means for transmitting constant pressure to said pneumatic thermostat;

means for transmitting said signal to an air volume controller which meters the air flow to said area in response to said signal; and means for overriding said signal generating means so that said controller provides maximum air flow to said area independently of said ambient temperature sensing means, said overriding means including a bi-metallic helical element for raising said ball from said seat when said element is activated upon introduction into said system of air having a temperature substantially different from that normally used in the system.

8. The apparatus of claim 7 further including means for adjusting the position of said helical element so that said helical element may be activated at different temperatures.

9. In an air distribution system for use in cooling an enclosed area by introducing thereto cool variable pressure air, said system including means for generating a pneumatic signal indicative of ambient temperature in said area and means for controlling the volume of air discharged into said area in response to said signal, the improvement comprising:

pressure regulator means having a pressure chamber for converting a portion of variable pressure air to constant pressure air provided in said pressure chamber so that said pneumatic signal is generated from said constant pressure air; and overriding means interacting with said converting means for overriding said signal generating means by reducing the pressure in said pressure chamber to a sufficiently low level to maintain said pressure signal at a minimum value regardless of the ambient temperature so that said controlling means will provide maximum air flow into said area independently of said signal generating means, said override means being activated by an increase in temperature of the air introduced into said air distribution system during periodic warm up cycles.

10. An apparatus as claimed in claim 8 further comprising:

aspirating means; and a conduit for carrying pressurized air from said variable pressure air supply to said aspirating means so that said aspirating means draws ambient air past said thermostat.

11. An apparatus for controlling the ambient temperature in an enclosed volume by regulating the flow of conditioned air into said enclosed volume, said apparatus comprising:

a pressure reducing valve including a first chamber having a bleed port, a second chamber having restricted inlet opening and a restricted outlet opening, and a ball resting on a valve seat interposed between said first chamber and said second chamber so that the weight of the ball is employed to regulate the pressure in said second chamber to provide a substantially constant pressure in said second chamber;

thermostat means for sensing the ambient temperature within said enclosed volume and generating from said constant pressure a pressure signal indicative of the ambient temperature;

control means for controlling in response to said pressure signal the flow rate of the conditioned air into said enclosed volume; and override means comprising a bi-metallic element inside said second chamber of said pressure reducing valve for lifting the ball so as to continuously bleed said second chamber, the bleeding of the second chamber reducing constant pressure in said second chamber to a level where the thermostat means is rendered ineffective, causing said regulating means to select the maximum flow rate of the conditioned air into said enclosed volume.

12. The apparatus of claim 1 wherein said overriding means is positioned inside said pressure regulating means in the flow path of said portion of variable pressure air.

13. The apparatus of claim 12 wherein said overriding means comprises a bi-metallic spring.

14. The apparatus of claim 11 wherein said bleed port communicates with air pressure downstream of said control means.

* * * * *